United States Patent
Deroover et al.

(10) Patent No.: US 10,808,136 B2
(45) Date of Patent: Oct. 20, 2020

(54) INDUSTRIAL DEINKING OF INK COMPOSITIONS

(71) Applicant: Xeikon Manufacturing N.V., Lier (BE)

(72) Inventors: Geert Gaston Paul Deroover, Lier (BE); Lode Erik Dries Deprez, Wachtebeke (BE)

(73) Assignee: Xeikon Manufacturing N.V., Lier (BE)

( * ) Notice: Subject to any disclaimer, the term of this patent is extended or adjusted under 35 U.S.C. 154(b) by 1108 days.

(21) Appl. No.: 14/392,167

(22) PCT Filed: Jun. 27, 2014

(86) PCT No.: PCT/NL2014/050426
§ 371 (c)(1),
(2) Date: Dec. 23, 2015

(87) PCT Pub. No.: WO2014/209124
PCT Pub. Date: Dec. 31, 2014

(65) Prior Publication Data
US 2016/0177118 A1 Jun. 23, 2016

(30) Foreign Application Priority Data

Jun. 28, 2013 (BE) .................................. 2013/0458
Aug. 2, 2013 (NL) ..................................... 1040321

(51) Int. Cl.
| | | |
|---|---|---|
| C09D 11/38 | (2014.01) | |
| C09D 11/326 | (2014.01) | |
| B01F 17/00 | (2006.01) | |
| C09D 11/03 | (2014.01) | |
| D21C 5/02 | (2006.01) | |
| D21H 19/46 | (2006.01) | |

(52) U.S. Cl.
CPC .......... C09D 11/38 (2013.01); B01F 17/0021 (2013.01); C09D 11/03 (2013.01); C09D 11/326 (2013.01); D21C 5/025 (2013.01); D21H 19/46 (2013.01)

(58) Field of Classification Search
None
See application file for complete search history.

(56) References Cited

U.S. PATENT DOCUMENTS

| | | | |
|---|---|---|---|
| 6,328,793 B1 | 12/2001 | Malhotra et al. | |
| 6,365,720 B1 | 4/2002 | Schacht et al. | |
| 7,888,428 B1* | 2/2011 | Ganapathiappan | C08F 2/22 524/800 |
| 8,246,754 B2 | 8/2012 | Nauka et al. | |
| 9,500,998 B2* | 11/2016 | Deprez | G03G 15/104 |
| 9,588,464 B2* | 3/2017 | Deprez | G03G 15/161 |
| 9,785,079 B2* | 10/2017 | Deprez | G03G 9/135 |
| 2009/0169765 A1 | 7/2009 | Nakamura et al. | |
| 2016/0041506 A1* | 2/2016 | Deprez | G03G 15/104 399/237 |
| 2016/0179035 A1* | 6/2016 | Deprez | G03G 15/161 399/249 |
| 2016/0291496 A1* | 10/2016 | Deprez | G03G 15/11 |
| 2017/0028733 A1* | 2/2017 | Deprez | G03G 9/1075 |

FOREIGN PATENT DOCUMENTS

| | | | |
|---|---|---|---|
| CN | 103160168 A | | 6/2013 |
| EP | 0001711 A1 | | 5/1979 |
| EP | 1502929 A1 | | 2/2005 |
| JP | 2010132786 A | * | 6/2010 |
| NL | 2011064 C2 | * | 1/2015 |
| NL | 2011067 C2 | * | 1/2015 |
| WO | 8002292 A1 | | 10/1980 |

OTHER PUBLICATIONS

Machine Translation of JP 2010-132786 (Year: 2010).*
English translation of CN 103160168, Jun. 2013; 16 pages.*
"Cleavable Surfactants" by Hellberg et al., Journal of Surfactants and Detergents 3, 81-91, Jan. 2000; 11 pages.*
European Recovered Paper Council, "Assessment of Printed Product Recyclability—Deinkability Score—", Mar. 17, 2009, pp. 1-8.
Ingede, "Ingede Method 2: Measurement of Optical Characteristics of Pulps and Filtrates from Deinking Processes," Aug. 1, 2011, pp. 1-11.
Ingede, "Ingede Method 11: Assessment of Print Product Recyclability—Deinkability Test—", Jul. 1, 2012, pp. 1-13.

* cited by examiner

*Primary Examiner* — Helene Klemanski
(74) *Attorney, Agent, or Firm* — The Webb Law Firm

(57) ABSTRACT

The ink composition comprises pigment particles and a stimulus responsive dispersing agent for dispersing said pigment particles in a protic polar solvent, for instance for inkjet printing, which stimulus responsive dispersing agent comprises an anchoring part for anchoring to said pigment particles, a stimulus responsive part as shown in formula (XXa) or (XXb) and a hydrophilic part for solvent stabilization of the pigment, wherein the stimulus responsive part upon exposure to a stimulus initiates decomposition of the stimulus responsive dispersing agent. The paper with the printed ink can be deinked in an industrial deinking process.

(XXa, XXb)

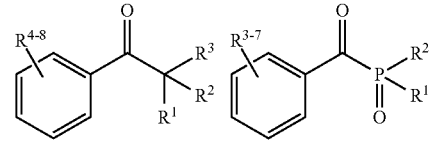

24 Claims, No Drawings

INDUSTRIAL DEINKING OF INK COMPOSITIONS

CROSS-REFERENCE TO RELATED APPLICATIONS

This application is the United States national phase of International Application No. PCT/NL2014/050426 filed Jun. 27, 2014, and claims priority to Belgian Patent Application No. 2013/0458 filed Jun. 28, 2013, and The Netherlands Patent Application No. 1040321 filed Aug. 2, 2013, the disclosures of which are hereby incorporated in their entirety by reference.

FIELD OF THE INVENTION

The present invention is related to an ink composition comprising a protic polar solvent, and to a method for preparing an ink composition, as well as the use of said composition.

The present invention further relates to a process of industrial deinking paper that has been printed with an ink composition comprising a protic polar solvent.

BACKGROUND OF THE INVENTION

Ink compositions based on a protic polar solvent such as alcohols and water, are known in the art and are used in printing apparatus, for instance in inkjet printing. Such ink compositions comprise hydrophilic dyes and/or pigment. Pigment particles are made hydrophilic through compounds e.g. dispersing agents that interact with the pigment. These compounds comprise a hydrophobic part for adhesion to the pigment. The compound furthermore comprises another part or group, the hydrophilic stabilizing part, which is able to stabilize the pigment complex in the protic polar solvent and renders the total of the pigment particle and the compound hydrophilic. The hydrophilic stabilizing part in the known ink compositions typically comprise carboxylic groups that are deprotonated to increase the polarity of the pigment and hence increase the hydrophilicity and dispersability.

A problem of such ink compositions is that during recycling of paper printed with ink compositions, deinking turns out to be very difficult, unless special coated or pretreated paper is used, which is rather expensive and unhandy. Such deinking during paper recycling, which is also referred to as industrial deinking, is the process in which the ink is separated from paper pulp, so as to obtain an uncolored white paper mass suitable for reuse.

In summary industrial deinking can occur as follows. In a first step the paper is mixed with water and some detergent and mechanical energy is applied to make a paper pulp. Thereafter, the pH level of the pulp is increased to between pH 8-9. Fibers of the paper will swell and break off the ink into smaller particles. Subsequently, small air bubbles are provided through the aqueous pulp mixture, so as to float away ink particles from the fibers. This process is called flotation. Most ink materials like the air phase more than the water phase. The air bubbles therefore take away the ink particles from the pulp mixture, creating a grey foam on the surface of the pulp mixture. This grey foam is then skimmed away, leaving behind a nearly pure white paper pulp, which can be used to make new paper.

This industrial deinking process works well with hydrophobic offset inks and digital toner prints. However, the industrial deinking of prints printed from ink compositions based on protic polar solvents encounters a lot of difficulties, since most of the ink particles in the paper pulp remain in the water phase during the flotation process. This is mainly because the dyes and pigment particles of inkjet ink are hydrophilic or form a complex with a compound so that the complex is hydrophilic.

An attempt to solve the problem is made through the image wise jetting of calcium salt solutions to the paper, just before printing. This helps to form larger insoluble calcium carboxylates that change the nature from the pigment from hydrophilic to hydrophobic. However, the calcium may react with carbon dioxide, available in the atmosphere, which dissolves in water. The calcium then precipitates as calcium carbonate. This calcium carbonate tends to give clogging of the printer nozzles, particularly of inkjet printers. The printer nozzles therefore have to be replaced very often which is not cost effective.

In order to prevent this from happening some manufacturers have changed the calcium ion containing jetting solution by an acidic solution (eg citric acid). This has the same effect during printing, i.e. it keeps the pigments on the surface of the paper, avoids penetration of the color through the paper creating ghost images on the back side and gives better color strength. This is due to the protonation of the carboxylate ions resulting in a less hydrophilic pigment particle rather than forming unsoluble calcium complexes. Unfortunately, this process is reversible under the alkaline conditions of the deinking process: the carboxylic acids are again deprotonated during the pulping phase and the pigments become water soluble again.

Another proposal is made in U.S. Pat. No. 8,246,754. According to this proposal, use is made of a specific photolabile entities that are labile under deep UV light (and thus stable in visible light). The entities are contained in the ink composition or in the substrate, and link the composition to the substrate. The linking is specified as forming bonds between the substrate and ink molecules in the ink composition. As expressed diagrammatically, the photolabile entities appear to form an adhesive (mono)layer between the substrate and the ink molecules. For deinking, these photolabile entities are then irradiated with UV, resulting in disintegration of the photolabile entities and rupturing the ink from the substrate.

However, there are some issues with the known proposal. First of all, the example does not appear to be reworkable. According to the example, the linker molecule is adhered by means of a bromide-group to the hydroxyl-group of the substrate. However, there is no clear reason why a bulky bromide group would be attracted to a hydroxyl-group without forming a bond. Hence, there is chemically no reason that the linker would adhere to the substrate at all. It is therefore not clear either that any specific effect could happen. Secondly, the example suggests that a bond is broken in a phenacyl-compound between a phenyl-ring and a carbonyl-group. Moreover, in the bond breaking, suddenly a methyl-group is present, which comes from nowhere. Therefore, the system as proposed in the example cannot work.

Furthermore, when reviewing the classes of compounds specified in the application to be UV-decomposable, at least the most important ones appear problematic. A first class are the ortho-nitrobenzyl-compounds. However, irradiation of ortho-nitrobenzyl compounds results in formation of a ring-structure. This is a slow process. The suggestion as shown in FIG. 5 that irradiation under a band would result in bond breaking is therefore irrealistic. Even when the ortho-nitrobenzyl compound is activated by the UV-radiation to form, radicals, it is most likely that the radicals are recombined and nothing happens. A second class is formed by the phenacyl compounds. Bond breaking of a cleavage surfactant comprising a phenacyl group was studied by Epstein et al., *Analytical Biochemistry*, 119(1982), 304-312. Here, irradiation was carried out overnight at 1.5 cm distance. That does not constitute a practical solution. Any further classes are just presented as is, without any information to chemical synthesis, photochemical behavior or the like.

Therefore, the skilled person cannot derive from this U.S. Pat. No. 8,246,754 any feasible solution of a photolabile compound suitable for use in an ink composition, which would enable deinking of paper.

SUMMARY OF THE INVENTION

It is therefore an object of the invention to provide a better solution for inks based on protic polar solvents, which on the one hand does not reduce printing performances and on the other hand also allows for industrial deinking. As to the printing performance, it is desired that the ink has a good adhesion to paper upon printing and as long as the paper is kept in use or stored.

This object, amongst other objects, can be obtained partially, if not completely, by an ink composition according to claim 1.

DETAILED DESCRIPTION OF THE INVENTION

In particular, this object is achieved, at least partially, by an ink composition comprising pigment and a stimulus responsive dispersing agent for dispersing said pigment in a protic polar solvent, which stimulus responsive dispersing agent comprises a stimulus responsive part and a hydrophilic part for solvent stabilization of the pigment, wherein the stimulus responsive part upon exposure to a stimulus, particularly UV-irradiation, initiates decomposition of the stimulus responsive dispersing agent, and wherein the stimulus responsive group comprises a combination of a benzoyl group with a polar group in an α-position to the carbonyl of the benzoyl group.

The invention is based on the insight, that the problem during industrial deinking can be solved by using a dispersing agent responsive to a stimulus in the form of UV-irradiation which can be applied at any stage as of the moment of printing. Thereto, more specifically, use is made of a chemically modified dispersing agent, which includes a stimulus responsive part, which part does not inhibit or reduce neither the anchoring properties nor the stabilizing properties of the dispersing agent nor the jettability. Exposure to a stimulus will initiate a transformation process within the dispersing agent, i.e. not requiring a further compound to react with. This transformation process results in decomposition of the dispersing agent.

The inventors surprisingly found that the decomposition will or may reduce the hydrophilicity of the pigment particle (complex). A substrate, such as paper, that is printed with inkjet ink according to the invention and which is exposed to a stimulus, provide good adhesion of the pigment into the paper structure and can be recycled and provides paper pulp of which most ink is able to be removed. Indeed, after making pulp of paper that is printed with inkjet ink according to the invention that has been exposed to a stimulus, the hydrophobic pigment complex is able to flotate and thus able to be taken away with air bubbles flowing through the paper pulp solution. The foam on top of the paper pulp, now comprises the hydrophobic pigment complex, and is subsequently skimmed away rendering paper pulp that can be used to make new paper.

According to the invention, conventional dispersing agents may be modified to become stimulus responsive, or alternatively, an additional stimulus responsive dispersing agent may be used. The former may for instance be achieved by grafting, onto the dispersing agent, a suitable stimulus responsive part with a hydrophilic stabilization part coupled thereto. The latter appears a versatile option that may be relatively simple from synthetic perspective, and wherein the amount of stimulus response can be easily tuned.

Preferably, the pigment is available in the form of pigment particles and the stimulus responsive dispersing agent comprises an anchoring part for anchoring of the pigment particles. A pigment particle is for instance a mixture of pigment and dispersing agent or an encapsulated pigment that is processed, for instance by milling, to a desired size. The anchoring part more particularly results therein that the stimulus responsive dispersing agent, being at least partially arranged at or even outside the surface of the pigment particle, is anchored, i.e. chemically coupled or physically adsorbed to said pigment particle. This anchoring onto the pigment particle is understood to be beneficial for ensuring that the pigment does not flow away from paper during its use.

Decomposition of the stimulus responsive dispersing agent will not lead to decomposition of the pigment particle, but merely modify its surface structure and/or its sensitivity for and therewith its dispersing ability in polar protic solvents. As a consequence, the decomposition of the stimulus responsive dispersing agent may even improve the adhesion of the ink to paper during its use. Particularly, the ink may become less sensitive for flowing out if it is accidentally brought into contact with water or such a solvent.

Particularly, the stimulus responsive dispersing agent decomposes in two or more parts after exposure to a stimulus. The decomposing causes that the hydrophilic stabilizing part and the anchoring part are no longer connected. More particularly, breaking of a covalent bond within the stimulus responsive dispersing agent occurs, and more particularly within the stimulus responsive part.

The remaining anchoring part is suitably hydrophobic, and may remain anchored to the pigment particle. However, the latter is not necessary. Particularly in case that the anchoring is based on adhesion, the anchoring may be lost. This may for example occur in case wherein the stimulus responsive part provides stability to the adhesive force between the anchoring part and the pigment. If the stimulus responsive part decomposes, this can have an influence on the stability of the adhesive force. In such case the adhesive force may be reduced so much, that the anchoring is lost and the pigment particles are separated from the anchoring parts of the dispersing agent.

Preferably, the stimulus is visible light, UV-light, infrared or microwave radiation or heat. Most preferably, the stimulus is UV-light. Visible light is herein a suitable alternative, since an ink composition may easily be produced and stored with protection from visible light. When the ink composition is printed, it will be exposed to visible light for the first time. That moment is however not too early for starting the decomposition. It will be understood by those skilled in the art, that there is likely a relationship between the choice of a stimulus responsive part and the stimulus, since the stimulus responsive part is often responsive to a specific wavelength or a range of wavelength or is merely responsive to heat.

According to the invention, the photolabile group comprises a combination of a benzoyl-group with a polar group adjacent thereto, i.e. in the so called α-position to the carbonyl of the benzoyl group. Herewith, good results have been obtained. Particularly, the invention makes use of a decomposition known per se as a Norris type I reaction. This reaction may occur more quickly than any other type of photochemical decomposition, such no ring formation is required. The benzoyl-group (i.e. -Ph-(C═O)—) tends to give a relatively stable radical intermediate, on the basis of the polar groups on the α-position, which prevents or limits recombination of the radical intermediate without bond breakage.

The polar group on the α-position more specifically comprises a heteroatom, such as oxygen, nitrogen or phosphorous. More preferably, the relevant stimulus responsive group is chosen from the compounds according to the formula (XXa) and (XXb), wherein R denotes any type of suitable substituent, and wherein in formula (XXa) at least one of $R_1$-$R_3$ is a heteroatom (N or O), and wherein the stabilizing part and the anchoring part are arranged as substituents R on opposed sides of the shown group.

(formulas XXa and XXb)

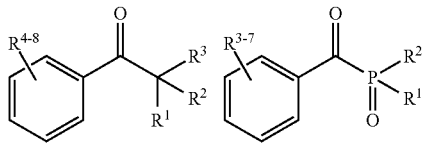

Moreover, the phenyl-group Ph may be substituted accordingly, for instance to attach an anchoring part. Further groups may be coupled to the carbonyl-group, for which a variety of options are available, including optionally substituted alkyl, such as a substituted methyl and acid groups. Preferred examples hereof include a phenyl-methyl group, with the methyl adjacent to the benzoyl, which methyl may be further substituted, for instance with hydroxyl, alkoxy, amine, methyl or other alkyl or even aralkyl. The acid group could be a carboxylic acid, but is preferably a phosphonic acid or sulphonic acid or any such acid as known to the skilled person. Therefore, this benzoyl-group is a photolabile group that can suitably be integrated into the dispersing agent of the invention.

In a further implementation, the stimulus responsive part comprises a photolabile group is selected from the group consisting of:
2-phenyl-2-hydroxy-1-phenylethanone moiety;
2-oxo-1,2-diphenylethyl formate moiety;
hydroxyacetophenone derivative;
alkylaminoacetophenone derivative;
benzyl ketal derivative a TPO derivative (i.e. a derivative of (diphenylphosphoryl)(2,4,6-trimethylphenyl)methanone);
a benzoyl phosphinoxide derivative
a benzoyl phosphinate derivative, for instance a TPO-L derivative (i.e. a derivative of phenyl-(2,4,6-trimethyl-benzoyl)-phosphinic acid ethyl ester);
a bisacyl- or bisbenzoylphosphine oxide, for instance a derivative of [phenyl-(2,4,6-trimethyl-benzoyl)-phosphinoyl]-(2,4,6-trimethyl-phenyl)-methanon).

Preferably, the pigment particles according to the invention are pigment particles that are known in the art and are able to be used in ink compositions. More particularly, use is for instance made of organic pigments and/or carbon black, which tend to give biggest problems in deinking. Examples are cyan pigments, for instance based on copper phtalocyanine and also known as C.I. Pigment Blue 15, magenta pigments, for instance based on quinacridone red, such as for instance C.I. Pigment Red 122, yellow pigments, such as for instance based on arylide yellow, of which C.I. Pigment Yellow 74 is an example black pigments, for instance C.I. Pigment Black 7. The pigments.

Those pigments may be encapsulated and/or provided with any typical ink additives, such as a polymer dispersing agent also known as solid acrylic resins, for instance based on polystyrene-polyacrylic acid salt copolymers and polybutyl acrylate polyacrylic acid salt. Alternatively or additionally use can be made of surfactant type dispersing agents. In order to prepare the pigment particles, the pigment is suitably mixed with dispersing agent in a polar protic solvent (weight ratio is for instance 2:1), which is thereafter milled. The resulting master batch is diluted and mixed with further ingredients, such as co-solvents, humectants, wetting agents, surfactants, rheological agents and biocides. The stimulus responsive dispersing agent may be used as the dispersing agent in the pigment particle, or is alternatively added as a further ingredient. In a further embodiment, a combination of dispersing agents is used, among which the stimulus responsive dispersing agent.

Preferably, the anchoring part of the stimulus responsive dispersing agent is able to anchor on the pigment of the ink composition of the invention. The anchoring may occur physically, such as by adhesion, adsorption or even absorption. The anchoring alternatively occurs chemically, such as by grafting or integration. Preferably, the anchoring is an physical process, for instance adhesion through hydrophobic interactions and/or Van der Waals intermolecular interactions between the pigment particle and the anchoring part. Such anchoring may be further enhanced in that several chains in the anchoring part interact with each other upon adhesion to the pigment particle, or the pigment itself.

Preferably, at least one of the anchoring part and the hydrophilic stabilization part comprises an elongated chain, for instance with a chain length of at least 8, more preferably at least 10 atoms. Such a chain is very effective to create a spatial structure wherein the hydrophilic stabilization part may be arranged at a suitable distance from the pigment particle surface. This is beneficial for the dispersing capability in the solvent. More suitably, at least the anchoring part comprises such a chain.

More preferably, the anchoring part comprises a regular carbon-based chain. In this manner, interaction may occur between adjacent dispersing agent molecules to build up a (partial) layer or aggregate, therewith strengthening the adhesion. Examples of suitable carbon-based chains include alkyl-chain, for instance C6-c16 alkyl chains, polyethylene-oxide chains, polyethylene-amine-chains. For instance a chain as used in soap, such as an octyl-, decyl-, or dodecyl-chain, suitably functionalized, may be used. An especially preferred embodiment is a carboxylated polyethylenimine.

In one further embodiment, the anchoring part is grafted on such a polymer, for instance a dispersing agent known in the art. It is deemed beneficial, also in this situation, that the anchoring part comprises a chain with a minimum chain length. The anchoring part may then be selected to interact also with the protic polar solvent, for instance by means of inclusion of atoms or groups suitable for hydrogen bonding.

In one suitable embodiment, the anchoring part comprises a polymer material. This embodiment is particularly suitable for replacement of the known acrylic resin dispersing agents.

Suitable polymers are for instance polyamides, polyester, polyurethane, polyketone, poly(acrylo)nitrile, polyacrylate, vinylether polymer, arylvinyl polymer, and copolymers thereof and therewith. The polymeric chain hereof may further include aromatic and/or heteroaromatic groups, for instance to include a stimulus responsive part therein.

Preferably, the hydrophilic stabilizing part is able to stabilize the pigment in an aqueous environment. Such an aqueous environment is, in the context of inkjet printing, often a solvent mixture of water and alcohols. The hydrophilic stabilizing part may be charged, for instance in the form of an acid anion. Some examples thereof are anions of carboxylicic acid, phosphinic acid, sulphonic acid. Alternatively or additionally, the hydrophilic part may contain a polar group, for instance based on a amine or preferably quaternary ammonium ion or amide —(C=O)—NR2. In again a further alternative, the hydrophilic part may contain a polyalcohol group and/or a polyamine group, such as derived from glycol, polyethylene glycol, polyvinylalcohol, cellulose, polyalcohols, hydrophilic ethers, which evidently may further contain carboxylic groups.

It is observed for clarity that the anchoring part and/or the hydrophilic stabilizing part may contain more than a single group. I.e. two or more anchoring units or chains may be present in the dispersing agent. Likely two hydrophilic chains may be present. Those chains are suitably coupled into the stimulus responsive part as the center part of the compound.

Preferably, the stimulus responsive dispersing agent comprises 1, 2, 3, 4, 5, 6, 7, 8, 9, 10 or more stimulus responsive parts. The amount of stimulus responsive parts depends on the size and molecular weight of the dispersing agent. Further, the amount of the stimulus responsive part in the stimulus responsive dispersing agent depends on the response efficiency and kinetics of the part towards the stimulus.

Some preferred stimulus responsive dispersing agents will hereinafter be discussed individually.

One class is a benzoine derivative with the structural formula (I), wherein R1, R2 are suitably electron-donating groups, such as alkoxygroups, for instance $R_1$-$R_3$-alkoxy, and wherein R3 and/or R4 form part of the anchoring part, and X comprises the hydrophilic stabilizing part, or vice versa. The benzoine derivative is decomposed upon stimulation into derivatives of a compound with the structural formulas (II) and (III). The bond to be activated by the stimulus appears to be the bond adjacent to the carbonyl group. Herein, the carbonyl group gets activated to ring closure. The hydrogen atom on the 2-position of the phenyl-ring herein migrates:

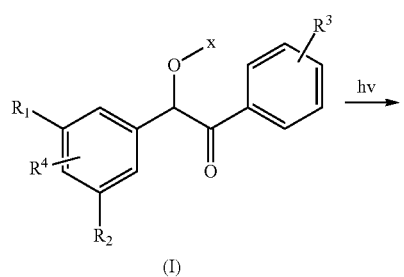

(I)

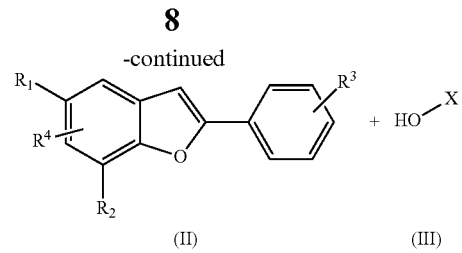

(II)            (III)

Another example of a benzoine derivative comprising the structural formula (IV), wherein R1, R2 are again electron-donating groups and R3 and/or R4 form part of, or comprise the anchoring part, and X comprises the hydrophilic stabilizing part, or vice versa. Herein, the derivative is decomposed upon stimulation to derivatives having the structural formulas (V) and (VI);

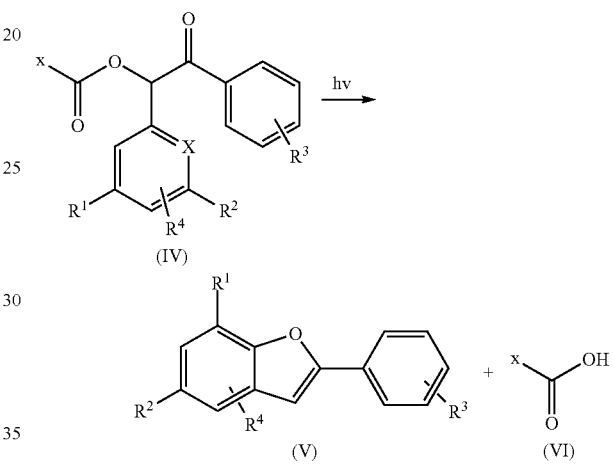

(IV)

(V)            (VI)

It will be understood by those skilled in the art that other benzoine-derivatives are not excluded. If only one of $R_3$ and/or $R_4$ is an anchoring part, or optionally a hydrophilic part, the remaining one may be H or a suitable substituent. The use of hydrophilic part as group X, and the anchoring part as $R_3$ and/or $R_4$ seems most beneficial Again another example of the stimulus responsive dispersing agent is a derivative of hydroxyacetophenone (HAP), which decomposes, after stimulation, into a phenylacetone derivative and the hydrophilic stabilizing part, wherein the anchoring part is coupled to the phenyl-group. The reversed arrangement of anchoring part and hydrophilic stabilization part is not excluded.

A further suitable dispersing agent is a derivative of alkoxy acetophenone comprising the structural formula (VII), wherein X forms part of, or comprises the hydrophilic stabilizing part, and R1, R2 and/or R3 form part of the anchoring part, or vice versa. This derivative decomposes, after stimulation, to derivatives with the structural formula (VIII) and (IX):

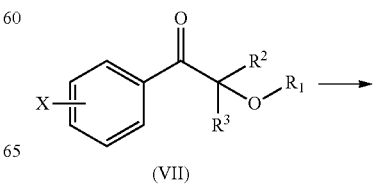

(VII)

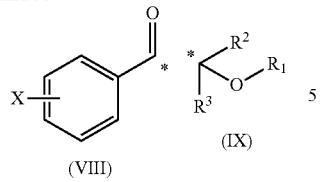

While X is shown as a single substituent, it is not excluded that the phenyl-ring is more than once substituted, or that several substituents are coupled to an alkyl substituent to the phenyl-ring. In case $R_1$, $R_2$ or $R_3$ are not anchoring parts, it appears most suitable that at least $R_1$ is the anchoring part (or alternatively the hydrophilic stabilizing part). $R_2$ and $R_3$ may then be chosen rather widely.

A suitable variant is an alkylaminoacetophenone derivative (AAAP) that decomposes, after exposure to a stimulus, in a phenylacetone derivative and an amino derivative. Suitably, the anchoring part is coupled to the phenylacetone derivative and the hydrophilic stabilizing part is coupled to the amino derivative, though the reverse is feasible as well.

One example thereof is the derivative shown in the structural formula (XI), wherein X forms part of, or comprises the anchoring part, and wherein R1, R2, R3 and/or R4 form part of, or comprise the hydrophilic stabilizing part (or vice versa). The derivative decomposes, after exposure to a stimulus, in derivatives with the structural formulas (XII) and (XIII), or in derivatives with the structural formulas (XIV) and (XV).

Again a further dispersing agent is a benzyl ketal derivative comprising the structural formula (XVI), wherein R1, R2 and/or R3 form part of, or comprise the hydrophilic stabilizing part, and X comprises or form part of the anchoring part, wherein the derivative decomposes, after exposure to a stimulus, in derivatives with the structural formula (XVII) en (XVIII);

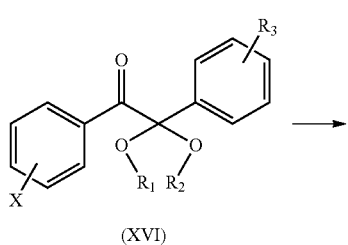

It will be understood in relation to the preceding two examples, that the derivatives generated upon stimulation are radicals and that these will further react, either by means of rearrangement, or for instance with solvent molecules. Not all of $R_1$-$R_4$ need to be dedicated for anchoring, or stabilizing, and can then be chosen widely.

Even further derivatives are for instance a TPO derivative (i.e. a derivative of (diphenylphosphoryl)(2,4,6-trimethyl-phenyl)methanone), a TPO-L derivative (i.e. a derivative of phenyl-(2,4,6-trimethyl-benzoyl)-phosphinic acid ethyl ester) and a BAPO derivative ((i.e. a derivative of [phenyl-(2,4,6-trimethyl-benzoyl)-phosphinoyl]-(2,4,6-trimethyl-phenyl)-methanon).

In the context of the application "derivative" is to be understood as the basis skeleton of the compound as is shown via the compound name or the structural formula. The derivative may comprise a compound with other moieties, comprising but not limited to the anchoring part or the hydrophilic stabilizing part. A "derivative" may also refer to a radical form of the basis skeleton of the compound as is shown via the compound name or the structural formula.

In another aspect, the invention is related to a method for providing an ink composition according to the invention comprising mixing a stimulus responsive dispersing agent and a pigment or pigment particle in an protic polar solution. In a first embodiment the stimulus responsive dispersing agent is mixed with the pigment. It is herein deemed beneficial that the stimulus responsive part and the hydrophilic part of the agent are coupled to a primary mixing agent, such as an solid acrylic resin, for instance by grafting. In a further implementation, the stimulus responsive dispersing agent may be used in combination with a conventional dispersing or mixing agent. Such mixing agent may be a dispersing agent that is modified to include less hydrophilic stabilizing parts than currently used. In another embodiment, the stimulus responsive agent is mixed with the pigment particle. This particularly occurs after defining a size of the pigment particle, for instance by milling.

Further aspects relate to the use of the ink composition for printing on a substrate such as paper, and for industrial deinking. It will be understood that the ink composition of the present invention may be used on any type of substrate, even though some of these substrates may not be recycled in an industrial deinking process. Examples of substrates include polymer films such as in use in packaging industry, polymer coatings and encapsulated devices, such as for instance semiconductor devices provided with a moulding compound. Due to the decomposition of the stimulus responsive dispersing agent, the adhesion to such—typically hydrophobic—substrate is enhanced. The substrate may for instance be composed of polyethylene, polypropylene, epoxy resin, polyimide and/or copolymers thereof.

The exposure suitably is carried out either simultaneously with the printing or directly after printing. Following options appear suitable: after application (i.e. for instance from a printer nozzle), but before drying; or after application and drying, or initiated upon start of the printing, i.e. for instance by exposure to irradiation when entering or leaving the printer nozzle.

The invention furthermore relates to an (inkjet) printer comprising a printing nozzle and an irradiation source for irradiating an ink composition with a pigment particle and a stimulus responsive dispersing agent for dispersing said pigment particle, which stimulus responsive dispersing agent comprises a stimulus responsive part and a hydrophilic part, wherein the stimulus responsive part upon exposure to a stimulus initiates decomposition of the stimulus responsive dispersing agent.

This printer is advantageous, since it comprises the functionality to stimulate the stimulus responsive part of the ink composition of the invention. Such functionality is for instance an irradiation source or a sequence of irradiation sources, for instance one or more lasers or one or more light emitting diodes. Such irradiation source is for instance integrated into a printing nozzle, and/or into a tube or ejecting pipe from the nozzle. However, the irradiation source may alternatively be configured to irradiate a substrate after printing.

The invention furthermore relates to a paper obtainable by printing of the ink composition of the invention. It will be understood by those skilled in the art that the ink composition is dried after its disposal on the paper. This suitably occurs without any specific heating step. The term 'paper' is herein understood to refer to any type of substrate typically referred to as paper.

The invention furthermore relates to the deinking of such paper, and to the use of the ink composition of the invention when adhered to paper, for deinking. This use preferably comprises the steps of a conventional paper recycling process, i.e. the generation of a paper pulp, the flotation of the paper pulp for transfer of the ink into an air phase, i.e. typically a foam, and the removal of the foam from the paper pulp.

It is observed that the exposure of ink composition to the stimulus may also be carried out as part of the deinking process. For instance, the exposure may be carried out at the beginning of such process, or alternatively at the end or even after the flotation process. Such a process step could ensure that any available ink composition of the invention is exposed to a stimulus, so as to minimize the amount of color left in or to the paper pulp.

The advantages, embodiments and preferred forms for the ink composition as described above correspond mutatis mutandis with this aspect of the invention.

EXAMPLES

The invention is further explained by the following non-limiting examples in accordance with the invention Example 1

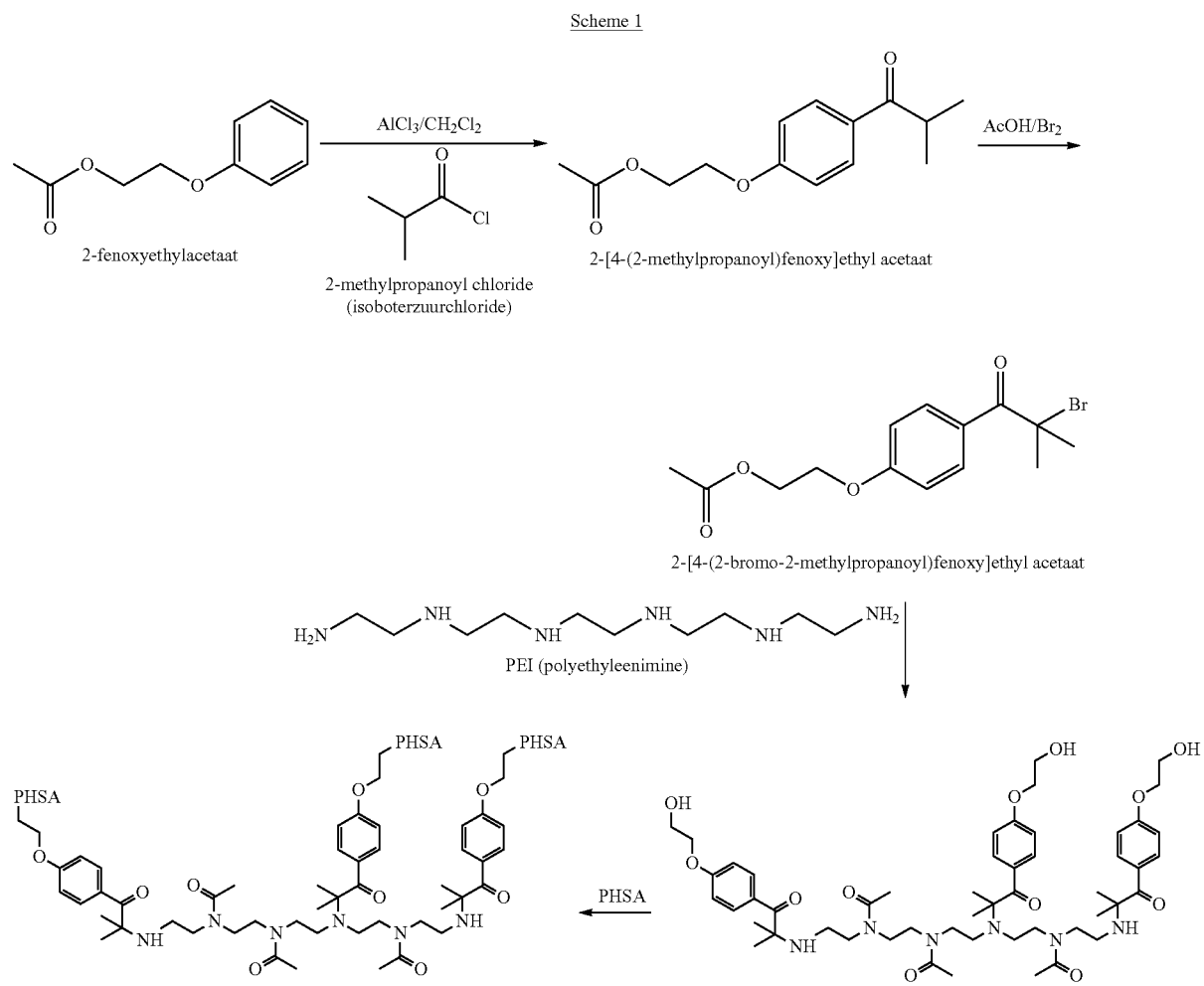

Scheme 1

In accordance with example 1 a dispersing agent for use in the invention is prepared. This dispersing agent is prepared in accordance with Scheme 1, wherein PHSA is used to refer to polyethylene oxide. The anchoring part of this dispersing agent is formed by those PHSA chains, of which a plurality is present per dispersing agent. The hydrophilic stabilizing part is formed by the amide groups, i.e. acetylated secondary amine groups (R2N—C=O—CH3), which groups are highly polar and suitable for hydrogen bonding with the solvent. The stimulus responsive part herein comprises a benzoyl-group to which an isopropyl amine group is attached. In fact, the dispersing agent comprises several stimulus responsive centers. In this example, upon irradiation the pentaethylene-amine structure will be split off from one or more of the polyethylene oxide groups. This may result in that rather hydrophobic chains remain. However, it is not excluded that the regular structure of the polyethylene oxide chains falls apart and that the anchoring ability of the rest of the molecule is therewith lost, i.e. that it nog longer adheres to the pigment particle.

Synthesis of
2-[4-(2-methylpropanoyl)phenoxy]ethyl acetate

To a stirred solution of 29.4 g anhydrous aluminium trichloride at −5 to −0° C. in 20 ml of dichloromethane, 11.2 g of 2-methylpropanoylchloride is added dropwise during 30 min. After this, 18.0 g of 2-phenoxyethyl acetate is added dropwise at the same temperature for 1 h. The reaction mixture is stirred for 2 h at this temperature and then poured into a mixture of 60 ml concentrated HCl-solution and 80 ml of water. The organic phase is separated and the aqueous phase is 3 times extracted with 60 ml of dichloromethane. The organic phases are combined and washed with water, dried and evaporated under reduced pressure. 24.7 g (98.7%) of 2-[4-(2-methylpropanoyl)phenoxy]ethyl acetate was obtained.

Synthesis of 2-[4-(2-bromo-2-methylpropanoyl)phenoxy]ethyl acetate 25 g of 2-[4-(2-methylpropanoyl)phenoxy]ethyl acetate (compound 1) is dissolved in 20 ml of glacial acetic acid. To this, 19.2 g of bromine is added dropwise with stirring at room temperature over 2 h. After 10 h stirring, the reaction mixture was poured into 300 ml of glacial acetic acid and extracted with 3×150 ml of ethyl acetate. The combined extracts are dried with magnesium sulphate, filtered and evaporated under reduced pressure to a viscous oil.

In the next step, the photo-labile component is coupled with a polyethylenimine (PEI). This can be a linear or a branched PEI (such as the Lupasol polyethylenimines from BASF or the EPOMIN® products of Nippon Shokubai). In the synthesis described below, is worked with the linear pentaethylenehexamine (PEI-6).

Synthesis of an adduct of 2-[4-(2-bromo-2-methylpropanoyl)phenoxy]ethyl acetate on PEI-6

25 g of 2-[4-(2-bromo-2-methylpropanoyl)phenoxy]ethyl acetate (compound 2) is dissolved in 100 ml of ethanol. With stirring, 7.7 g of pentaethylenehexamine and then 15 g of N,N-diisopropylethylamine were added. After 2 h stirring, if necessary, the remaining free amino groups are acetylated with acetic anhydride and then 38 g of a 32% sodium hydroxide solution was added at room temperature. Ethanol is evaporated off and 300 ml of water is added. This mixture is extracted with 3×50 ml each of ethyl acetate. The organic phase is dried with sodium sulphate, filtered and evaporated.

Coupling of the Adduct to the Jeffamine-Isocyanate

To a mixture of 12.5 g of CDI (carbonyldiimidazole) in 25 ml of ethyl acetate is added dropwise 1 equivalent of a Jeffamine® consisting mainly of polyethylene oxide groups and commercially available from Huntsman Corp. After 30 min of stirring, 25 g of compound 3, dissolved in 25 ml of ethyl acetate, is added. This mixture is stirred for 6 hours at 60° C. After evaporation under reduced pressure an oil is obtained. This oil is mixed with 50 ml of water and then extracted with 3×50 ml of butyl acetate. After evaporation of the combined organic phases an oil is obtained which as such can be used as a dispersing agent.

Example 2

The synthesis of a further stimulus responsive dispersing agent is shown in Scheme 2. This scheme results in (4-decyl-benzoyl)-phenyl-phosphinic acid sodium salt. The alkyl-chain herein represents the anchoring part. The phosphinic acid sodium salt constitutes the hydrophilic stabilization part. The stimulus responsive part comprises the benzoyl-group, such that after exposure to irradiation (365 nm) the phenyl-phosphinic acid sodium salt is split off and a hydrophobic chain is left over.

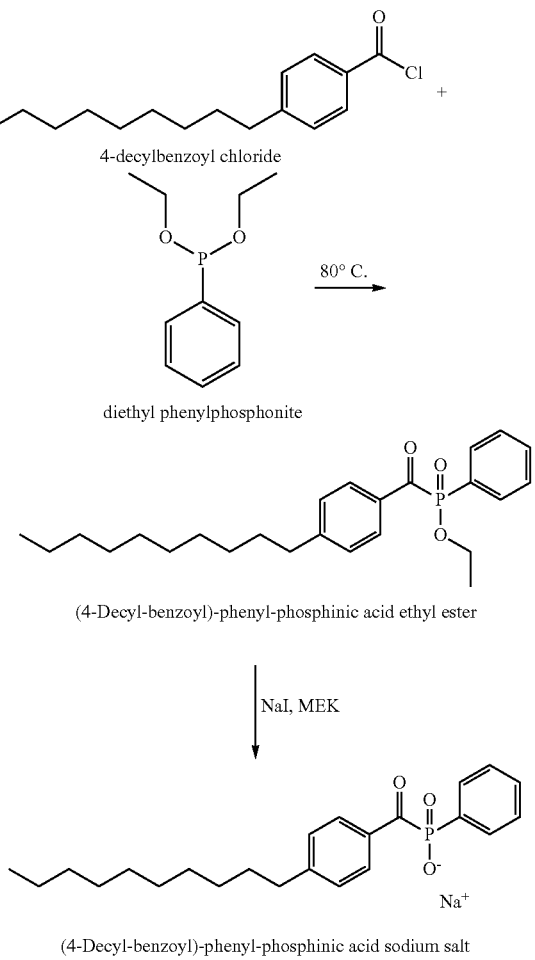

Scheme 2

Synthesis of (4-Decyl-benzoyl)-phenyl-phosphinic acid ethyl ester 14.0 g 4-decylbenzoylchloride and 9.9 g diethyl phenyl-phosphonite are heated at 80° C. under inert atmosphere for 6 hours. The resulting oil is used as such in the following reaction.

Synthesis of (4-Decyl-benzoyl)-phenyl-phosphinic acid sodium salt 20.7 g (4-Decyl-benzoyl)-phenyl-phosphinic acid ethyl ester is dissolved in 100 ml methyl ethyl ketone. 7.8 g sodium iodide is added to the solution. After 15 minutes stirring, the solution is heated to 65° C. for 24 hours. The precipitate is filtered, washed with 2×20 nil petroleum ether and dried under vacuum. The yellow powder, thus obtained, was used as a dispersing surfactant according to the above described description.

Application Example 1

An ink composition is made by mixing the above synthesized dispersing agent as made in accordance with example 1 with a pigment particle in an aqueous solution. The inkjet ink was used to be printed on a substrate and was subsequently exposed to UV-light with 254 nm. The hydrophilic stabilizing part was splitted of and a hydrophobic pigment complex was obtained.

Application Example 2

Deinkability tests were carried out with ink compositions comprising the dispersing agent made in accordance with example 1 both without exposure to UV radiation and after exposure to UV radiation. The deinkability tests used the protocol specified in Ingede Method 11 by Ingede, the International Association of Deinking Industry. The Ingede Method 11 is specified in a July 2012 report, available on the website of Ingede, www.ingede.de. The method involves the assessment of a set of parameters, i.e. the luminosity Y; the colour a; the dirt particle area A (for particles larger than 50 μm ($A_{50}$) and 250 μm ($A_{250}$); the ink elimination IE and the filtrate darkening $\Delta Y$. The measurement of these parameters is specified in Ingede method 2 (August 2011). These set of parameters is deemed representative for an industrial, wet deinking process as carried out during paper recycling, comprising the step of flotation. For the evaluation of parameters, use is made of a so called 'Deinkability Score', as specified by the European Recovered Paper Council (EPRC), adopted in 17/03/09 ERPC Meeting (document ref ERPC/005/09), and available from www.ingede.de. As specified in this Deinkability Score, each of the parameter results is converted into weighted score, the maximum sum of which is 100. If the calculated sum is 71 or more, the deinkability is good; a score of 51-70 represents a fair deinkability, a score of 0-50 represents a poor deinkability. A negative score means that the ink is not suitable for deinking and is based thereon that the ink failed to meet at least one threshold value. The said documents describing the method and its steps are herein included by reference.

Tests were carried out after printing the ink on 80 gsm (grams/m²) non coated paper. The paper coverage was 30%. The UV treatment was carried out immediately after printing.

The resulting score is following:

| Parameter | UV-treated ink | Ink without UV-treatment |
|---|---|---|
| Luminosity Y | 25-30 | 10-20 |
| Colour a | 20 | −20 |
| Dirty particle area A50 | 15 | 15 |
| Dirty particle area A250 | 10 | 10 |
| Ink elimination IE | 8-10 | −10 |
| Filtrate darkening $\Delta Y$ | 10 | −10 |
| SUM | 88 to 95 | not deinkable due to negative scores |

Thus, the invention provides, in summary, an ink composition comprises pigment particles and a stimulus responsive dispersing agent for dispersing said pigment particles in a protic polar solvent, for instance for inkjet printing, which stimulus responsive dispersing agent comprises an anchoring part for anchoring to said pigment particles, a stimulus responsive part and a hydrophilic part for solvent stabilization of the pigment, wherein the stimulus responsive part upon exposure to a stimulus initiates decomposition of the stimulus responsive dispersing agent. The paper with the printed ink can be deinked in an industrial deinking process.

The invention claimed is:

1. An ink composition comprising pigment particles and a stimulus responsive dispersing agent for dispersing said pigment in a protic polar solvent, which stimulus responsive dispersing agent comprises: an anchoring part for anchoring to a pigment particle,
   a hydrophilic stabilization part for solvent stabilization of the pigment, and
   a stimulus responsive part provided with a photolabile group, which stimulus responsive part initiates upon exposure to a stimulus being UV-light, decomposition of the stimulus responsive dispersing agent into a first agent comprising the anchoring part and into a second agent comprising the hydrophilic stabilization part,
   wherein the photolabile group is a combination of a benzoyl-group and a polar group in the α-position to the carbonyl of the benzoyl-group, which combination corresponds to the structural formula XXa or XXb:

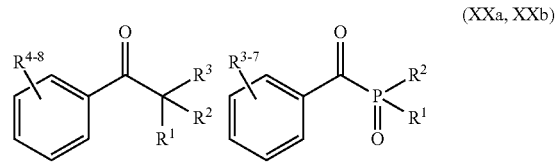

(XXa, XXb)

wherein
   $R^1$-$R^8$ are substituents or hydrogen;
   at least one of $R^1$-$R^3$ in formula (XXa) contains a heteroatom chosen from O and N bonded to the carbon atom in the α-position;
   the stabilizing part and the anchoring parts are bonded to the shown stimulus responsive part on opposed sides of the said combination.

2. The ink composition according to claim 1, wherein the photolabile group is selected from the group consisting of:
   2-phenyl-2-hydroxy-1-phenylethanone moiety;
   2-oxo-1,2-diphenylethyl formate moiety;
   hydroxyacetophenone derivative;
   alkylaminoacetophenone derivative;
   benzyl ketal derivative
   a benzoylphosphinoxide;
   a benzoylphosphinate; and
   a bisacyl- or bisbenzoyl phosphine oxide.

3. The ink composition according to claim 1, wherein the anchoring part comprises an elongated chain with a chain length of at least 8.

4. The ink composition according to claim 3, wherein the anchoring part comprises a polymer material.

5. The ink composition according to claim 4, wherein the anchoring part is attached to the phenyl ring of the benzoyl group.

6. The ink composition according to claim 1, wherein the hydrophilic stabilizing part comprises a polyalcohol group.

7. The ink composition according to claim 1, wherein the hydrophilic stabilizing part comprises a polar group or a charged group.

8. The ink composition according to claim 7, wherein the charged group is an acid anion.

9. The ink composition according to claim 1, wherein at least one of $R^1$ and $R^2$ contains a phenyl-group.

10. The ink composition according to claim 9, wherein said phenyl group is substituted with either the anchoring part or the stabilizing part.

11. The ink composition according to claim 1, wherein the stimulus responsive dispersing agent comprises two or more stimulus responsive parts.

12. The ink composition as claimed in claim 1, wherein the stimulus responsive part comprises a benzoine derivative comprising the structural formula (I) or (IV), wherein $R^1$, $R^2$ are electron-donating groups, X comprises the hydrophilic stabilizing part and $R^3$ and/or $R^4$ form part of or comprise the anchoring part:

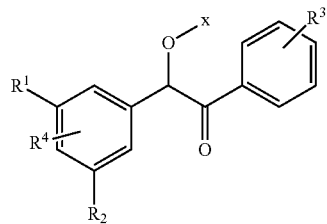

(I)

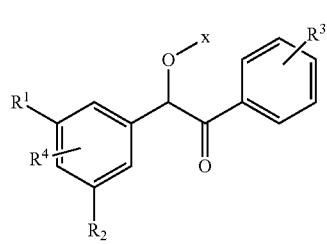

(IV)

13. The ink composition as claimed in claim 1, wherein the stimulus responsive part comprises a benzoine derivative comprising the structural formula (I) or (IV):

(I)

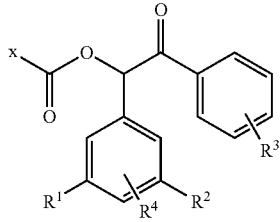

-continued (IV)

wherein $R^1$, $R^2$ are electron-donating groups, X comprises the anchoring part and $R^3$ and/or $R^4$ form part of or comprise the hydrophilic stabilizing part.

14. The ink composition as claimed in claim 1, wherein the protic polar solvent is a solvent mixture of water and one or more alcohols.

15. The ink composition as claimed in claim 1, wherein the photolabile group is a combination of a benzoyl-group and a polar group in the α-position to the carbonyl of the benzoyl-group according to the structural formula XXa:

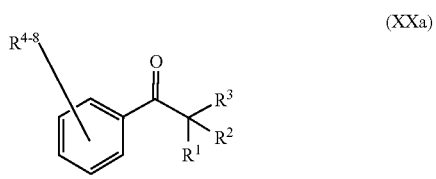

(XXa)

wherein
$R^1$-$R^8$ are substituents or hydrogen;
at least one of $R^1$-$R^3$ contains a heteroatom chosen from O and N bonded to the carbon atom in the α-position;
the stabilizing part and the anchoring parts are bonded to the shown stimulus responsive part on opposed sides of the said combination.

16. The ink composition as claimed in claim 1, wherein the photolabile group is a combination of a benzoyl-group and a polar group in the α-position to the carbonyl of the benzoyl-group according to the structural formula XXb:

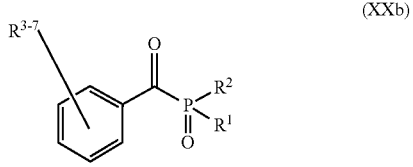

(XXb)

wherein
$R^1$-$R^7$ are substituents or hydrogen;
the stabilizing part and the anchoring parts are bonded to the shown stimulus responsive part on opposed sides of the said combination.

17. A method for printing the ink composition according to claim 1, comprising printing said ink composition onto a substrate.

18. The method according to claim 17, further comprising a step of decomposing the stimulus responsive dispersing agent into the first agent comprising the anchoring part, which is a hydrophobic moiety, and the second agent comprising the hydrophilic stabilization part.

19. The method according to claim 18, wherein the printing comprises an application step and a drying step and wherein the decomposition step occurs (i) after application before drying of the ink composition (ii) after application and drying of the ink composition or (iii) wherein the decomposition step is initiated by exposure to irradiation upon start of the application step.

20. The method according to claim 17, wherein the substrate is paper.

21. Paper with a print with the ink composition as claimed in claim 1.

22. A method of industrial deinking of the paper as claimed in claim 21 during recycling of paper, wherein the ink is separated from paper pulp so as to obtain an uncolored white paper mass suitable for reuse.

23. The method as claimed in claim 22, wherein a decomposition step of the stimulus responsive dispersing agent of the ink composition is carried out at a start of an industrial deinking process by applying UV-light as a stimulus.

24. The method as claimed in claim 22, wherein the industrial deinking comprises the steps of:
- mixing paper with water and detergent;
- applying mechanical energy to make a paper pulp;
- increasing a pH level of the paper pulp to between pH8-9;
- floating the paper pulp, so as to separate an ink-containing foam from a pulp mixture; and
- skimming away the ink-containing foam.

* * * * *

UNITED STATES PATENT AND TRADEMARK OFFICE
CERTIFICATE OF CORRECTION

PATENT NO. : 10,808,136 B2
APPLICATION NO. : 14/392167
DATED : October 20, 2020
INVENTOR(S) : Geert Gaston Paul Deroover et al.

Page 1 of 1

It is certified that error appears in the above-identified patent and that said Letters Patent is hereby corrected as shown below:

In the Claims

Column 16, Line 64, Claim 2, delete "derivative" and insert -- derivative; --

Column 16, Line 65, Claim 2, delete "benzoylphosphinoxide;" and insert -- benzoylphosphine oxide; --

Column 17, Line 26, Claim 12, delete "benzoine" and insert -- benzoin --

Column 17, Line 54, Claim 13, delete "benzoine" and insert -- benzoin --

Column 18, Line 13, Claim 13, delete "R1,R2" and insert -- R1, R2 --

Column 19, Line 25, Claim 24, delete "pH8-9;" and insert -- pH 8-9; --

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*